United States Patent
MacDonald et al.

(10) Patent No.: US 7,065,424 B1
(45) Date of Patent: Jun. 20, 2006

(54) SYSTEMS AND METHODS THAT MONITOR RE-QUALIFICATION INDICIA ASSOCIATED WITH DURABLE ITEMS TO ENSURE PHYSICAL PROCESS QUALITY

(75) Inventors: William MacDonald, Mansfield, TX (US); George Logsdon, Arlington, TX (US); Darren Lee Rust, Arlington, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 98 days.

(21) Appl. No.: 10/794,796

(22) Filed: Mar. 4, 2004

(51) Int. Cl.
*G06F 19/00* (2006.01)

(52) U.S. Cl. .................... 700/109; 700/121; 702/84

(58) Field of Classification Search .............. 700/90, 700/95, 109, 121; 702/84
See application file for complete search history.

(56) References Cited

U.S. PATENT DOCUMENTS

| | | | |
|---|---|---|---|
| 5,432,702 A | 7/1995 | Barnett | |
| 5,548,535 A | 8/1996 | Zvonar | |
| 5,591,299 A | 1/1997 | Seaton et al. | |
| 5,726,920 A | 3/1998 | Chen et al. | |
| 5,740,429 A | 4/1998 | Wang et al. | |
| 5,751,581 A | 5/1998 | Tau et al. | |
| 5,761,064 A | 6/1998 | La et al. | |
| 5,886,896 A | 3/1999 | Lantz et al. | |
| 5,896,294 A | 4/1999 | Chow et al. | |
| 5,914,879 A | 6/1999 | Wang et al. | |
| 5,972,727 A | 10/1999 | Ryan et al. | |
| 6,035,245 A | 3/2000 | Conboy et al. | |
| 6,035,293 A | 3/2000 | Lantz et al. | |
| 6,108,585 A | 8/2000 | Ryan et al. | |
| 6,156,580 A | 12/2000 | Wooten et al. | |
| 6,163,801 A | 12/2000 | O'Donnell et al. | |
| 6,174,738 B1 | 1/2001 | Steffan et al. | |
| 6,216,948 B1 | 4/2001 | Conboy et al. | |
| 6,223,203 B1 | 4/2001 | O'Donnell et al. | |
| 6,282,613 B1 | 8/2001 | Hsu et al. | |
| 6,308,107 B1 | 10/2001 | Conboy et al. | |
| 6,424,876 B1 | 7/2002 | Cusson et al. | |
| 6,449,522 B1 | 9/2002 | Conboy et al. | |
| 6,480,877 B1 | 11/2002 | O'Donnell et al. | |
| 6,546,523 B1 | 4/2003 | Boorananut et al. | |
| 6,597,973 B1* | 7/2003 | Barich et al. ................. 701/29 |
| 6,646,660 B1 | 11/2003 | Patty | |
| 2002/0143601 A1* | 10/2002 | Sinex ........................... 705/9 |

* cited by examiner

*Primary Examiner*—Jayprakash N. Gandhi

(57) ABSTRACT

This invention introduces systems and methods that control production process quality, wherein the production process has a plurality of durable items, each durable item is associated with a re-qualification process initiated as a function of a life expectancy associated therewith. The life expectancy associated with each durable item is reset upon completion of the associated re-qualification process. An exemplary method comprises (I) monitoring re-qualification indicia associated with each associated re-qualification process, and (ii) controlling availability of re-qualified durable items of the production process as a function of the re-qualification indicia to thereby control production process quality.

22 Claims, 3 Drawing Sheets

SYSTEMS AND METHODS THAT MONITOR RE-QUALIFICATION INDICIA ASSOCIATED WITH DURABLE ITEMS TO ENSURE PHYSICAL PROCESS QUALITY

TECHNICAL FIELD OF THE INVENTION

This invention relates generally to re-qualification of durable items used in a physical process, such as a manufacturing process, and, more particularly, to systems that monitor re-qualification indicia associated with such durable items to ensure that durable items are not re-associated with the physical process before re-qualification is complete, and methods of operating the same.

BACKGROUND OF THE INVENTION

Within physical process environments, durable items are essential elements in the various stages of the production process (each "durable item" is defined broadly as any process tool or other resource that is reused during physical processes, such as a furnace, for example). Such durable items are subject to normal wear and tear, as well as damage during use.

Conventional practice calls for re-qualifying such durable items either at specific time intervals based upon anticipated wear and tear (commonly referred to as "life expectancy"), or whenever a determination is made that a particular item is damaged.

By way of an example, photomasks (or reticles) are durable items that are used in lithography tools in semiconductor manufacturing facilities. Photomasks are subject to wear and tear, and re-qualification of the same is commonly initiated at pre-determined time intervals after a particular photomask is introduced into the physical process (i.e., at the end of the durable item's life expectancy; wherein a particular time interval is selected to ensure that the photomask remains viable for use in the process).

The re-qualification process of a photomask includes not only time spent reconditioning the item, but also time spent using the lithography tool for re-qualification of the mask rather than using the tool to manufacture products. Stated differently, conventional re-qualification practices result in the photomask being removed from the physical process at the expiration of some time interval, or life expectancy, and then it remains unavailable for use in the process for the entire lifetime of the re-qualification process.

In U.S. Pat. No. 4,351,029 ("the '029 Patent"), entitled "TOOL LIFE MONITORING AND TRACKING APPARATUS," the invention is directed to monitoring the quality of a tool on a set of machine tools to obtain an optimum tool life (e.g., a maximum volume of metal removed by the tool before re-sharpening). As excessive tool wear and tear may lead to increased forces on the tool, causing tool failure and interruption of production, the '029 Patent relies on net power measurement and derives the integration thereof via a function of time to obtain by reference to experience with a similar tool, the life expectancy of a particular tool. The '029 Patent attempts to avoid critical events at the end of such life expectancy.

In U.S. Pat. No. 6,021,360 ("the '360 Patent"), entitled "PROCESS CONTROLLER FOR BALANCING USAGE OF TOOL SETS," the invention is directed to monitoring usage of a tool on a set of machine tools and warns an operator, or prevents usage of a tool chosen by an operator, in order to balance usage among similar tools of a set of machine tools. The '360 Patent also teaches verifying operational conditions of tools of the set of machine tools through usage. In short, the operator is permitted full flexibility of tool choice unless tool usage becomes unbalanced, at which time the '360 Patent may limit usage based on length of consecutive usage and percentage of product processed by each tool.

In U.S. Pat. No. 6,427,090 ("the '090 Patent"), entitled "REQUALIFICATION CONTROLLER FOR DURABLES," the invention is directed to controlling the time at which a durable item used in a manufacturing process is re-qualified. The '090 Patent emphasizes the time at which the durable item is re-qualified as a function of the occurrence of a predefined event.

In U.S. Pat. No. 6,429,783 ("the '783 Patent"), entitled "APPARATUS FOR INDICATING OPERATIONAL STATUS OF SEMICONDUCTOR FABRICATION EQUIPMENT," the invention is directed to using status lights or other signs operable to indicate the operational status of a durable tool. The '783 Patent emphasizes use of the lights or signs to indicate that the tool is in use, available or in repair. The '783 Patent suggests use of a video camera system to monitor the status lights and to work with an automated system to generate a "warning" if the automated system and the status lights are in disagreement concerning the status of the durable tool.

While these exemplary inventions solve a variety of problems within the art concerning re-qualification of durable items, there is no systematic methodology to ensure proper re-qualification of durable items before the same are reintroduced into the production process, particularly as related to life expectancy, condition change with item usage pattern and item maintenance/re-qualification. There is simply no viable procedure for preventing operators from placing unqualified tools in the production process line. A need exists in the art for a method that encourages re-qualification of durable items, while maintaining a high-production volume of a high-quality product notwithstanding undetected unsuitable conditions or failure of a durable item within the physical process.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 to 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged production process to control production process quality.

An exemplary production process will have a plurality of durable items, each durable item being associated with a re-qualification process initiated as a function of a life expectancy associated therewith. "Life expectancy," as the phrase is used herein, is defined broadly as the anticipated lifetime of a durable item determined as a function of a given production process' use of the item, whether continuous, intermittent or some combination of the same (the determination may also include factors associated with manufacturer lifetime recommendations, historical information concerning this item or similar items, or the like; the life expectancy of an item may be predetermined, determined at runtime, calculated or the like, and may be static or dynamic).

According to this method, the life expectancy associated with each durable item is reset upon completion of the associated re-qualification process. An exemplary method comprises (i) monitoring re-qualification indicia associated with each associated re-qualification process, and (ii) controlling availability of re-qualified durable items of the production process as a function of the various re-qualification indicia to thereby control production process quality.

Figure 1:
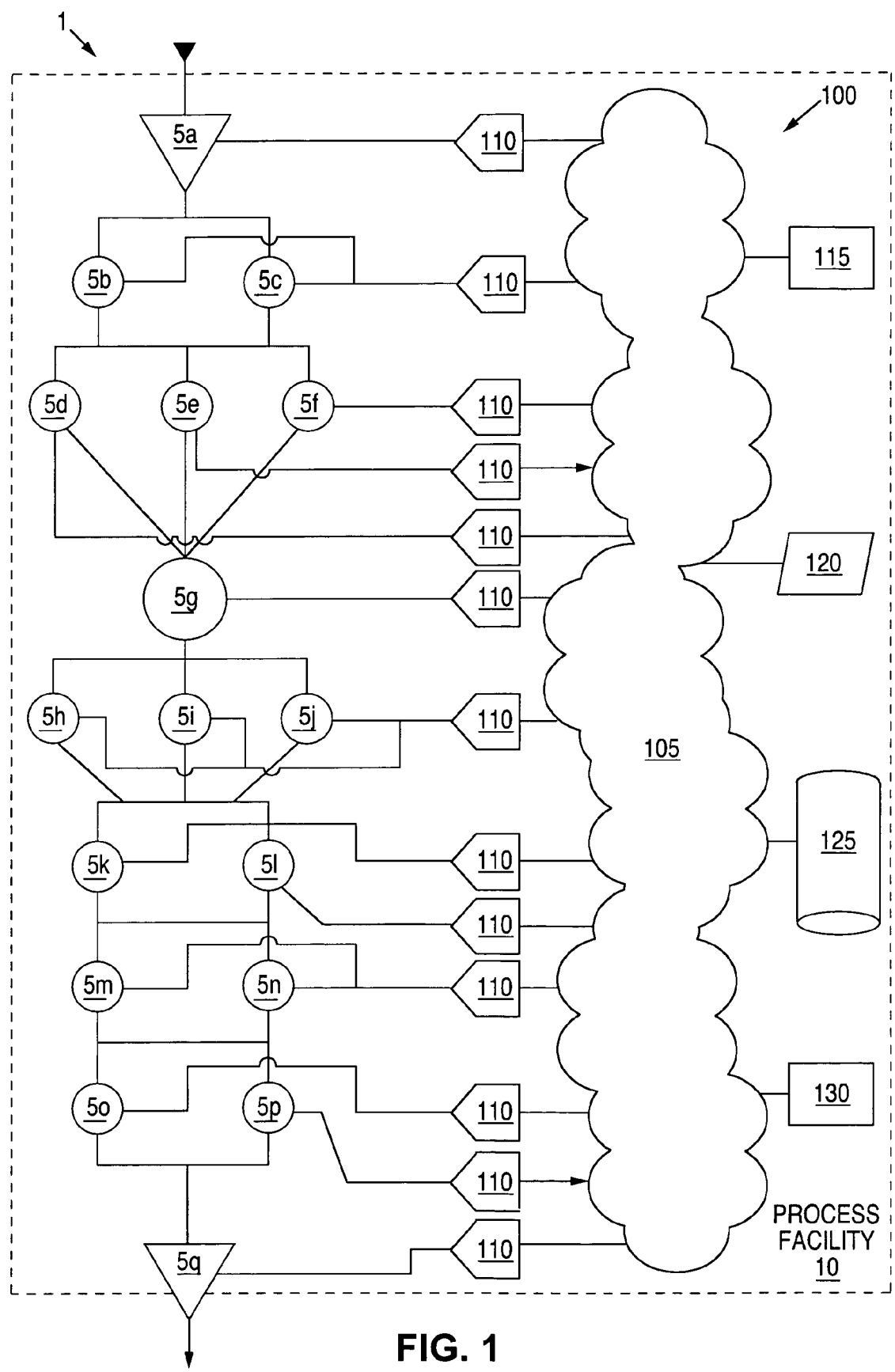
FIG. 1 illustrates a block diagram of an exemplary processing system that controls production process quality in accordance with the principles of the present invention.

FIG. 1 illustrates a block diagram of an exemplary process system 100 that operates to control quality of a production process 1, such as a manufacturing process, within a process facility 10 in accordance with the principles of the present invention. Exemplary production process 1 includes a plurality of durable items 5. Exemplary process system 100 is implemented across a processing system network 105 that illustratively associates a plurality of durable item processing systems 110, an automated production process system 115, at least one input/output unit 120, at least one memory 125 and a re-qualification monitoring system 130.

Each exemplary durable item processing system 110 is associated with at least one durable item 5 and operates to control the same. Such control may be as simple as monitoring readings associated with the durable item, such as temperature, pressure, or the like, or may be as complex as operating the durable item or possibly two or more interrelated durable items to perform one or more functions. With respect to an advantageous embodiment hereof, one or more durable items 5 are capable of performing multiple functions, such as providing different processing stages or types of processing stages within a production process 1, which is capable of producing different products or product lines.

Exemplary automated production process system 115 operates to control production process 1, which, in the field of semiconductor fabrication processes, may suitably be the WORKSTREAM® automated system sold by CONSILIUM, INC. of Mountain View, Calif. Automated production process system 115 is further operable to download the status of durable items 5 to associated durable item processing systems 110.

Exemplary input/output unit 120 operates to allow operators or other authorized personnel to interact with process system 100. I/O Unit 120 is illustratively shown as a single device, there may of course be more than one I/O Unit 120 associated with process system 100. Exemplary memory 125 operates to store all information associated with process system 100, including the status of each durable item 5. Memory 125 may be any suitable memory and may be in the form of a single storage device or multiple storage devices, and may be spread across processing system network 105.

Exemplary re-qualification monitoring system 130 operates to monitor re-qualification indica associated with durable items 5 to ensure that durable items 5 are not re-associated with the physical process before re-qualification is complete. The re-qualification indicia may be included in part within the durable item status. Re-qualification monitoring system 130 controls availability of re-qualified durable items 5 of the production process 1 as a function of the various re-qualification indicia to thereby control production process quality. Advantageously, re-qualification monitoring system 130 is associated with automated production process system 115. In operation, and continuing with the semiconductor manufacturing example, a first durable item 5 has at least one use and is within an associated re-qualification process. Re-qualification monitoring system 130 will operate to deny availability of first durable item 5 for use as a function of the re-qualification indicia because first durable item 5 is within the associated re-qualification process and, by such, controls semiconductor manufacturing process quality.

Before completing this detailed description of the invention, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "system" means any device, system or part thereof that controls at least one operation, such a device may be implemented in hardware, firmware or software, or some combination of at least two of the same. It should be noted that the functionality associated with any particular system may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Figure 2:
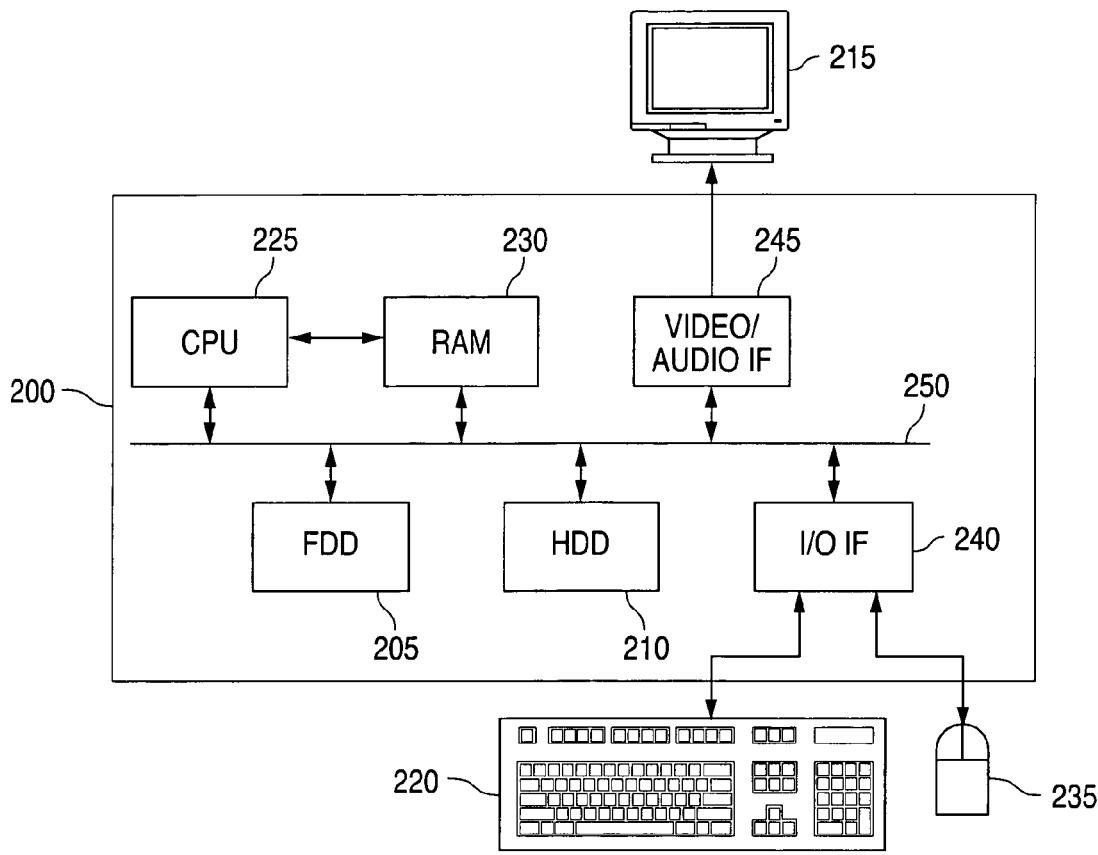
FIG. 2 illustrates a block diagram of an exemplary processing system in accordance with the principles of the present invention.

FIG. 2 illustrates an exemplary processing system 200, such as a computer, that is operable to (i) monitor re-qualification indicia associated with each associated re-qualification process, and (ii) controlling availability of re-qualified durable items 5 of the production process 1 as a function of the various re-qualification indicia to thereby control production process quality, all according to the principles of the present invention. Processing system 200 may also be programmed to perform any of the functions of durable item processing systems 110, automated production process system 115, or re-qualification monitoring system 130. Likewise, any of the same may be combined, even in part, to accomplish the purposes hereof. For purposes of illustration, concurrent reference is made to the embodiment of FIG. 1.

Processing system 200 illustratively includes a removable disk drive 205, a hard disk drive 210, a monitor 215, a keyboard 220, a processor 225, a main memory 230, a pointing device 235 (such as a mouse), an input/output (I/O) interface 240, and an audio/video (A/V) interface 245. Monitor 215, keyboard 220, and mouse 235 may be replaced by, or combined with, any other suitable I/O devices.

Exemplary removable disk drive 205 may suitably be capable of reading and writing to removable diskettes. Exemplary hard disk drive 230 may suitably be capable of fast access for storage and retrieval of application programs and data. The internal components of processing system 200, including floppy disk drive 205, hard disk drive 210, processor 225, memory 230, I/O interface 240 and A/V interface 245, are coupled to and communicate across a communications bus 250.

Re-qualification monitoring system 130 of FIG. 1 may suitably be implemented with processing system 200, which may be programmed to control quality of a semiconductor manufacturing process 1, for example. Again, referring to FIG. 1, semiconductor manufacturing process 1 includes a plurality of durable items 5, each item being associated with a re-qualification process (not shown) initiated as a function of a life expectancy associated therewith. The life expectancy associated with each durable item 5 being reset upon completion of any associated re-qualification process. Re-qualification monitoring system 130 is operable to (i) monitor re-qualification indicia associated with each associated re-qualification process, and (ii) control availability of re-qualified durable items 5 of semiconductor manufacturing process 1 as a function of re-qualification indicia to thereby control semiconductor manufacturing process quality.

Figure 3:
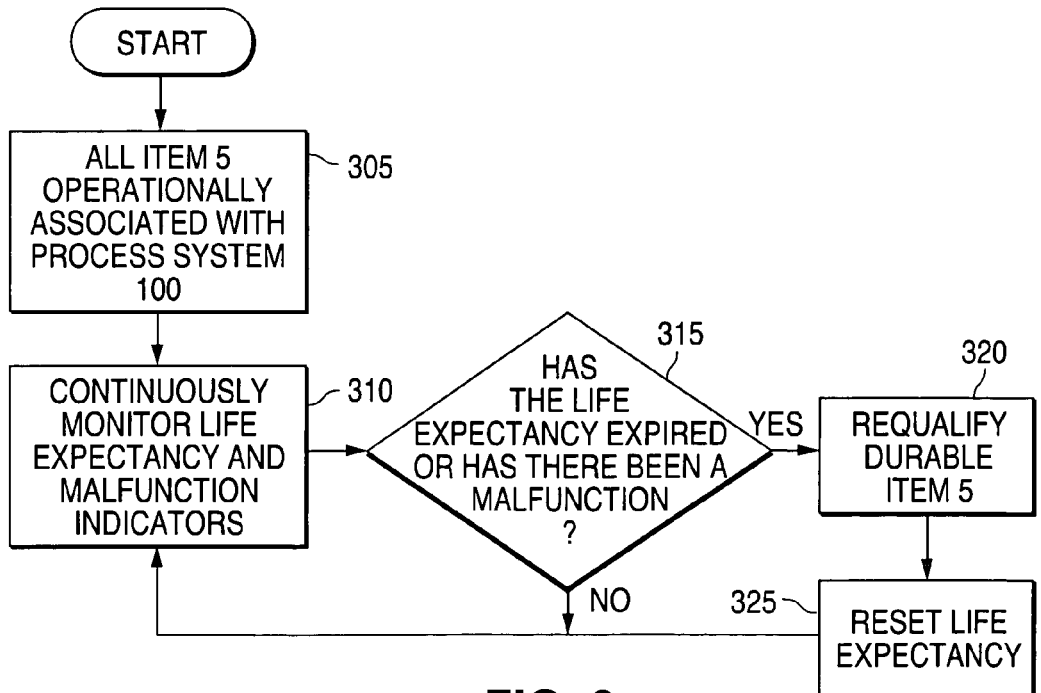
FIG. 3 illustrates a flow diagram of an exemplary method for controlling production process quality in accordance with the principles of the present invention.

FIG. 3 illustrates a flow diagram of an exemplary method (generally designated 300) for controlling production process quality by denying availability of a durable item 5 as a function of the re-qualification indicia associated therewith because durable item 5 is within, or has not sufficiently completed, an associated re-qualification process, all in accordance with the principles of the present invention. For purposes of illustration, concurrent reference is made to the embodiments of FIGS. 1 and 2.

Initially, each durable item processing system 110 is operationally associated with at least one durable item 5 (process step 305). For purposes hereof, it is assumed that all durable items 5 are operating normally and are considered operationally available within production process 1. Each durable item 5 is associated with a re-qualification process that is initiated either (i) as a function of a life expectancy of the particular durable item 5, or (ii) in response to the particular durable item 5 malfunctioning. The life expectancy associated with each durable item 5 should only be reset upon completion of the associated re-qualification process.

Each durable item processing system 110 continuously monitors the life expectancy associated with each durable item 5, as well as any indicators or controls (including operator controls) to indicate durable item malfunction (process step 310). Generally speaking, so long as the life expectancy associated a particular durable item 5 has not expired, nor is the particular durable item 5 malfunctioning, then the particular durable item 5 continues to operate within production process 1 ("N" branch of decision step 315). If the life expectancy associated with a particular durable item 5 expires, or the particular durable item 5 malfunctions, then the particular durable item 5 is designated unavailable within process system 100, and, more particularly, with automated production process system 115 ("Y" branch of decision step 315).

The "unavailability" status of the particular durable item 5 may be indicated visually, for instance, on a monitor of an associated durable item processing system 110. The particular durable item 5 is re-qualified (process step 320). Upon completion of the re-qualification process, the life expectancy associated a particular durable item 5 is reset (process step 325). Re-qualification monitoring system 130 is operable to (i) monitor re-qualification indicia associated with each re-qualification process, and (ii) control availability of re-qualified durable items 5 of semiconductor manufacturing process 1 as a function of re-qualification indicia to thereby control semiconductor manufacturing process quality. Re-qualification indicia and the life expectancy associated with each durable item 5 may be derived, directly or indirectly, as a function of the other. For instance, the life expectancy associated with durable item 5 may be reset in response to setting the re-qualification indicia to "complete" (or vice versa).

According to one embodiment hereof, re-qualification monitoring system 130 operates to ensure that all re-qualification process steps have been satisfactorily completed. If such steps are not completed, even if the associated life expectancy is reset, then associated durable item 5 is precluded from operating within production process 1 until completion.

In a related embodiment, re-qualification monitoring system 130 is operable to accord availability of associated durable item 5 when the re-qualification indicia indicates that the re-qualification process is incomplete in response to a control signal. The control signal may suitably indicate that (i) durable item 5 is available for a first use associated therewith although the re-qualification process in incomplete (e.g., re-qualification is sufficiently complete to allow performance of at least one function, or the like; this may occur, for instance, when process facility 10 or production process 1 produces various products), or (ii) an operator having proper authorization has overridden the re-qualification process.

Figure 4:
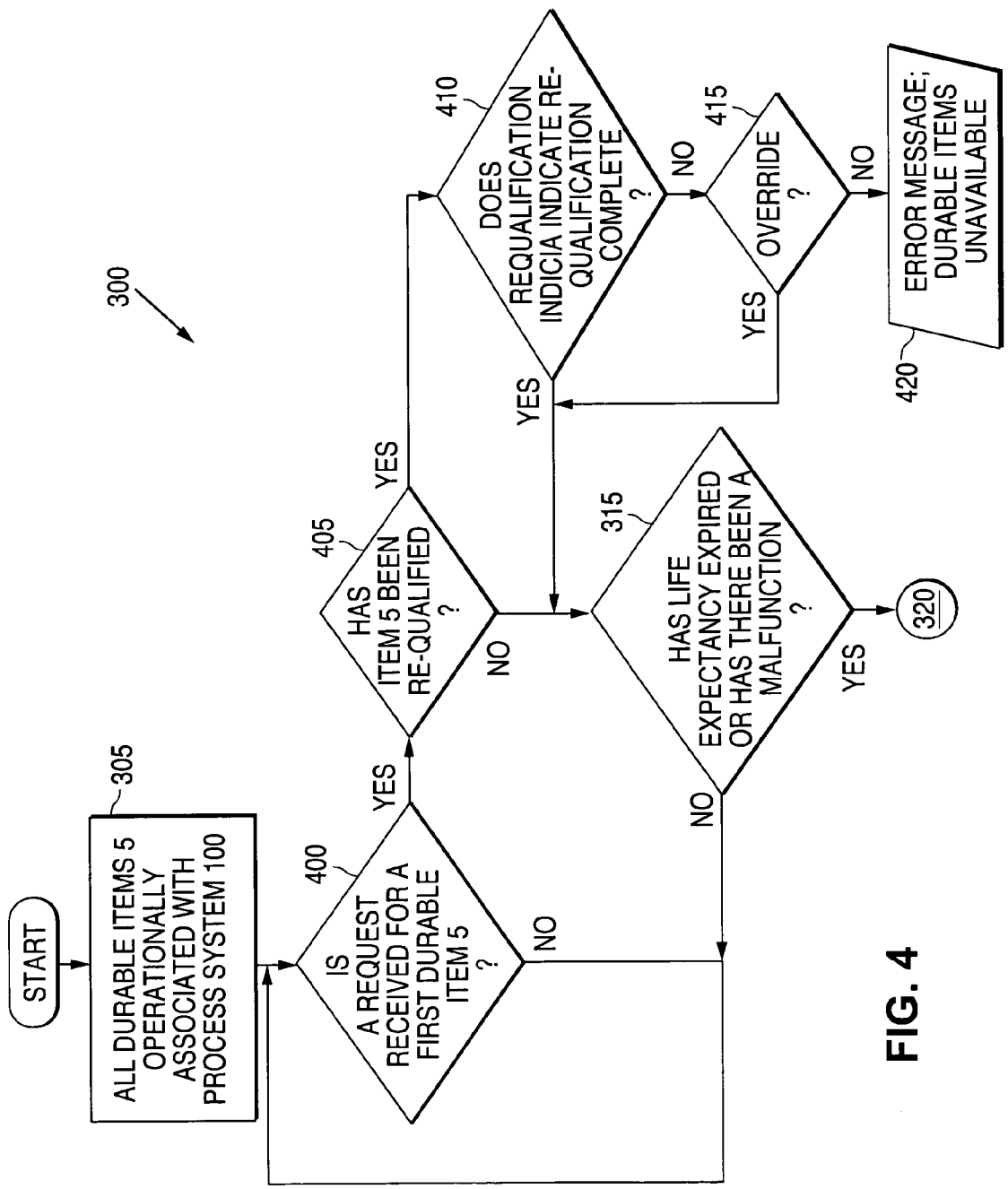
FIG. 4 illustrates a more detailed flow diagram of an exemplary method for controlling production process quality in accordance with the principles of the present invention.

FIG. 4 illustrates a more detailed flow diagram of an exemplary method (generally designated 300) for controlling production process quality by deny availability of a durable item 5 as a function of the re-qualification indicia because durable item 5 is within, or has not sufficiently completed, an associated re-qualification process, all in accordance with the principles of the present invention. For purposes of illustration, concurrent reference is made to the embodiments of FIGS. 1 to 3.

Again, each durable item processing system 110 is operationally associated with at least one durable item 5 (process step 305). For purposes hereof, it remains assumed that all durable items 5 are operating normally and are considered operationally available within production process 1. Each durable item 5 is still associated with a re-qualification process that is initiated either (i) as a function of a life expectancy of the particular durable item 5, or (ii) in response to the particular durable item 5 malfunctioning.

Initially, each durable item processing system 110 continuously monitors requests for use of an associated durable item 5 (decision step 400). According to the present embodiment, if an availability request for a first durable item 5 is received ("Y" branch of decision step 400), then re-qualification monitoring system 130 determines whether first durable item 5 has been re-qualified (decision step 405; this step may of course be flagged to occur every time an availability request is received, only once after a re-qualification process has been undertaken, or otherwise).

If first durable item 5 has not been re-qualified ("N" branch of decision step 405), then so long as the life expectancy associated first durable item 5 has not expired, nor is first durable item 5 malfunctioned, then first durable item 5 continues to operate within production process 1 ("N" branch of decision step 315); otherwise, first durable item 5 is re-qualified (goto process step 320 of FIG. 3).

If first durable item 5 has been re-qualified ("Y" branch of decision step 405), then re-qualification monitoring system 130 determines whether the re-qualification indicia associated with durable item 5 indicates that the re-qualification process is "complete" (decision step 410). If the re-qualification indicia associated with durable item 5 indicates that the re-qualification process is "complete" ("Y" branch of decision step 410), then so long as the life expectancy associated first durable item 5 has not expired, nor is first durable item 5 malfunctioned, then first durable item 5 continues to operate within production process 1 ("N" branch of decision step 315); otherwise, first durable item 5 is re-qualified (goto process step 320 of FIG. 3).

If the re-qualification indicia associated with durable item 5 indicates that the re-qualification process is "incomplete" ("N" branch of decision step 410), then, broadly, re-qualification monitoring system 130 will operate to deny availability of first durable item 5 and generate a suitable message, possibly directed to an operator/supervisor, to thereby control the semiconductor manufacturing process' quality by not allowing a unqualified item to operate with production process 1 (process step 420).

Advantageously, according to the illustrated exemplary embodiment, a further determination may be made to determine whether a control signal to override re-qualification monitoring system 130 was generated (decision step 415). If a control signal was received ("Y" branch of decision step 415), then re-qualification monitoring system 130 will not generate a message and, so long as the life expectancy associated first durable item 5 has not expired, nor is first durable item 5 malfunctioned, then first durable item 5 will operate within production process 1 ("N" branch of decision step 315); otherwise, first durable item 5 will again be re-qualified (goto process step 320 of FIG. 3).

It should be noted that the control signal may be generated by an appropriate operator/supervisor having proper authorization; however, in an alternate embodiment, re-qualification monitoring system 130 may generate the control signal upon a determination that first durable item 5 is re-qualified for a first use associated therewith although the entire re-qualification process is incomplete.

Although the present invention has been described in detail, those skilled in the art should understand that they can make various changes, substitutions and alterations herein without departing from the spirit and scope of the invention in its broadest form.

What is claimed is:

1. A method of controlling quality of a production process, said production process having a plurality of durable items, each said durable item associated with a re-qualification process initiated as a function of a life expectancy associated with said each said durable item, said life expectancy associated with said each said durable item reset upon completion of said associated re-qualification process, said method comprising the steps of (I) monitoring re-qualification indicia associated with each said associated re-qualification process, and (ii) controlling availability of re-qualified durable items of said production process as a function of said re-qualification indicia to thereby control production process quality.

2. The method of controlling quality of a production process as set forth in claim 1 further comprising the step of deriving re-qualification indicia in response to said life expectancy associated with said each said durable item.

3. The method of controlling quality of a production process as set forth in claim 1 further comprising the step of resetting said life expectancy associated with said each said durable item upon completion of said re-qualification process.

4. The method of controlling quality of a production process as set forth in claim 3 further comprising the step of setting said re-qualification indicia to complete in response to resetting said life expectancy associated with said each said durable item.

5. The method of controlling quality of a production process as set forth in claim 3 wherein the step of resetting said life expectancy associated with said each said durable item is responsive to the step of setting said re-qualification indicia to complete.

6. The method of controlling quality of a production process as set forth in claim 1 wherein a first durable item has at least one use associated therewith and is within a first associated re-qualification process, said method further comprising the step of denying availability of said first durable item as a function of said re-qualification indicia to thereby control production process quality.

7. The method of controlling quality of a production process as set forth in claim 1 wherein a first durable item has at least one use associated therewith and is within a first associated re-qualification process, said method further comprising the step of according availability of said first durable item as a function of said re-qualification indicia to thereby control production process quality.

8. The method of controlling quality of a production process as set forth in claim 7 further comprising the step of according availability of said first durable item when said re-qualification indicia indicates that said re-qualification process is incomplete in response to a control signal.

9. The method of controlling quality of a production process as set forth in claim 8 wherein said control signal indicates that said first durable item is available for a first use associated therewith although said re-qualification process in incomplete.

10. The method of controlling quality of a production process as set forth in claim 8 wherein said control signal is generated by an operator having proper authorization.

11. The method of controlling quality of a production process as set forth in claim 1 wherein a first re-qualification process may be initiated in response to a first durable item malfunctioning.

12. A method of controlling quality of a semiconductor manufacturing process, said semiconductor manufacturing process having a plurality of durable items, each said durable item associated with a re-qualification process initiated as a function of a life expectancy associated with said each said durable item, said life expectancy associated with said each said durable item reset upon completion of said associated re-qualification process, said method comprising the steps of (i) monitoring re-qualification indicia associated with each said associated re-qualification process, and (ii) controlling availability of re-qualified durable items of said semiconductor manufacturing process as a function of said re-qualification indicia to thereby control semiconductor manufacturing process quality.

13. The method of controlling quality of a semiconductor manufacturing process as set forth in claim 12 further comprising the step of deriving re-qualification indicia in response to said life expectancy associated with said each said durable item.

14. The method of controlling quality of a semiconductor manufacturing process as set forth in claim 12 further comprising the step of resetting said life expectancy associated with said each said durable item upon completion of said re-qualification process.

15. The method of controlling quality of a semiconductor manufacturing process as set forth in claim 14 further comprising the step of setting said re-qualification indicia to complete in response to resetting said life expectancy associated with said each said durable item.

16. The method of controlling quality of a semiconductor manufacturing process as set forth in claim 14 wherein the step of resetting said life expectancy associated with said each said durable item is responsive to the step of setting said re-qualification indicia to complete.

17. The method of controlling quality of a semiconductor manufacturing process as set forth in claim 12 wherein a first durable item has at least one use associated therewith and is within a first associated re-qualification process, said method further comprising the step of denying availability of said first durable item as a function of said re-qualification indicia to thereby control semiconductor manufacturing process quality.

18. The method of controlling quality of a semiconductor manufacturing process as set forth in claim 12 wherein a first durable item has at least one use associated therewith and is within a first associated re-qualification process, said method further comprising the step of according availability of said first durable item as a function of said re-qualification indicia to thereby control semiconductor manufacturing process quality.

19. The method of controlling quality of a semiconductor manufacturing process as set forth in claim 18 further comprising the step of according availability of said first durable item when said re-qualification indicia indicates that said re-qualification process is incomplete in response to a control signal.

20. The method of controlling quality of a semiconductor manufacturing process as set forth in claim 19 wherein said control signal indicates that said first durable item is available for a first use associated therewith although said re-qualification process in incomplete.

21. The method of controlling quality of a semiconductor manufacturing process as set forth in claim 19 wherein said control signal is generated by an operator having proper authorization.

22. The method of controlling quality of a semiconductor manufacturing process as set forth in claim 12 wherein a first re-qualification process may be initiated in response to a first durable item malfunctioning.

* * * * *